(12) United States Patent
Ishihara et al.

(10) Patent No.: US 10,406,944 B2
(45) Date of Patent: Sep. 10, 2019

(54) VEHICLE SEAT

(71) Applicant: TS TECH CO., LTD., Asaka-shi, Saitama (JP)

(72) Inventors: Kazunori Ishihara, Tochigi (JP); Takayoshi Katori, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/748,375

(22) PCT Filed: Jul. 29, 2016

(86) PCT No.: PCT/JP2016/072366
§ 371 (c)(1),
(2) Date: Jan. 29, 2018

(87) PCT Pub. No.: WO2017/022675
PCT Pub. Date: Feb. 9, 2017

(65) Prior Publication Data
US 2018/0222356 A1    Aug. 9, 2018

(30) Foreign Application Priority Data

Jul. 31, 2015   (JP) .................................. 2015-152365

(51) Int. Cl.
*B60N 2/16* (2006.01)
*B60N 2/54* (2006.01)
(Continued)

(52) U.S. Cl.
CPC ......... *B60N 2/1615* (2013.01); *B60N 2/0232* (2013.01); *B60N 2/165* (2013.01);
(Continued)

(58) Field of Classification Search
CPC .... B60N 2/1615; B60N 2/0232; B60N 2/165; B60N 2/1675; B60N 2/54; B60N 2/68; B60N 2/682
(Continued)

(56) References Cited

U.S. PATENT DOCUMENTS 4,128,225 A * 12/1978 Kluting ................ B60N 2/1615
248/421
7,861,994 B2 * 1/2011 Yamada ............... B60N 2/1615
248/421
(Continued)

FOREIGN PATENT DOCUMENTS

JP    2002-321551 A    11/2002
JP    2007-112393 A     5/2007
(Continued)

*Primary Examiner* — Mark R Wendell
(74) *Attorney, Agent, or Firm* — Drinker Biddle & Reath LLP

(57) ABSTRACT

A torsion bar configured to assist height adjustment of a seat cushion frame is housed in a hollow coupling pipe positioned between side frames. The inside of the coupling pipe has first and second engagement portions configured to engage and hold one end portion of the torsion bar in an extension direction thereof. The first engagement portion is engaged with a first engaged portion of the one end portion. The second engagement portion is engaged with a second engaged portion of the one end portion in the same position as a position of engagement between the first engagement portion and the first engaged portion in the seat width direction or in a position on the inner side from the position of engagement in the seat width direction, the second engaged portion being positioned closer to one end of a biasing member in the extension direction than the first engaged portion.

11 Claims, 11 Drawing Sheets

(51) Int. Cl.
*B60N 2/68* (2006.01)
*B60N 2/02* (2006.01)

(52) U.S. Cl.
CPC .............. *B60N 2/1675* (2013.01); *B60N 2/54* (2013.01); *B60N 2/68* (2013.01); *B60N 2/682* (2013.01)

(58) Field of Classification Search
USPC ..................................................... 297/344.12
See application file for complete search history.

(56) References Cited

U.S. PATENT DOCUMENTS

| | | | |
|---|---|---|---|
| 8,616,645 B2* | 12/2013 | Ito | B60N 2/1615 297/344.15 |
| 9,108,538 B2* | 8/2015 | Becker | B60N 2/045 |
| 2009/0261224 A1 | 10/2009 | Yamada et al. | |
| 2010/0019526 A1 | 1/2010 | Wada et al. | |

FOREIGN PATENT DOCUMENTS

| | | |
|---|---|---|
| JP | 2008-207636 A | 9/2008 |
| JP | 2010-228497 A | 10/2010 |

* cited by examiner

VEHICLE SEAT

CROSS REFERENCE TO RELATED APPLICATIONS

This application is a National Stage Entry application of PCT Application No. PCT/JP2016/072366, filed Jul. 29, 2016, which claims the priority benefit of Japanese Patent Application No. JP 2015-152365, filed Jul. 31, 2015, the contents being incorporated herein by reference.

BACKGROUND

The present disclosure relates to a vehicle seat, and particularly relates to a vehicle seat configured so that an arrangement space of a biasing member configured to assist height adjustment of a seat cushion by a height adjustment mechanism is conserved.

Vehicle seats provided with a height adjustment mechanism configured to adjust the height of a seat cushion are already known. Among such vehicle seats, some vehicle seats are configured so that when the height adjustment mechanism upwardly moves the seat cushion, a biasing member upwardly biases a predetermined portion of the seat cushion to assist adjustment of the height of the seat cushion (for example, see Japanese Patent Publication JP 2010-228497 A).

Specifically, in the vehicle seat described in Japanese Patent Publication JP 2010-228497 A, a torsion bar (a torsion rod spring) is utilized as the above-described biasing member. The torsion bar extends between a pair of links in the seat width direction. Moreover, one end portion of the torsion bar is fixed to one of the links (technically, an end portion of a torque rod coupling the links). The other end portion of the torsion bar extends around to the outside of the other link to be locked to a base frame of the seat. According to the above-described configuration, a restoring force of the torsion bar acts as a biasing force on the links; therefore, upward movement of the seat cushion due to pivotal movement of the links is assisted.

Upon utilization of the above-described biasing member, the biasing member is disposed in the vehicle seat. In this case, it is preferable that the biasing member is disposed between the links in the seat width direction as in Japanese Patent Publication JP 2010-228497 A, in view of reducing a size of the vehicle seat. However, when the biasing member is disposed between the links, a suitable arrangement space for the biasing member needs to be provided; naturally, it is preferable that such an arrangement space is as small as possible. Moreover, the biasing member needs to be properly held in an arrangement position so that the biasing member favorably performs the biasing function.

SUMMARY

The present disclosure has been made in view of the above-described problem, and an embodiment of the present disclosure is to provide a vehicle seat configured so that a biasing member configured to assist height adjustment of a seat cushion is suitably disposed.

The above-described problem is solved by an embodiment of a vehicle seat according to the present disclosure. The vehicle seat includes: a seat cushion frame including side frames provided respectively at both end portions of the seat cushion frame in the seat width direction; a height adjustment mechanism operable to adjust the height of the seat cushion frame; a biasing member configured to assist adjustment of the height of the seat cushion frame by the height adjustment mechanism; and a hollow member extending in the seat width direction and disposed between the side frames. The biasing member extends in the seat width direction while being housed in the hollow member. First and second engagement portions configured to be engaged and to hold one end portion of the biasing member in an extension direction thereof are formed inside the hollow member. The first engagement portion is engaged with a first engaged portion of the one end portion of the biasing member in the extension direction. The second engagement portion is engaged with a second engaged portion of the one end portion of the biasing member in the extension direction in the same position as a position of engagement between the first engagement portion and the first engaged portion in the seat width direction or in a position on the inner side from the position of engagement in the seat width direction, the second engaged portion being positioned closer to one end of the biasing member in the extension direction than the first engaged portion.

In the above-described configuration, the biasing member is housed in the hollow member, and therefore, the biasing member can be more compactly disposed. Moreover, the inside of the hollow member has the first and second engagement portions configured to engage and to hold the one end portion of the biasing member in the extension direction. Moreover, the first engagement portion is engaged with the first engaged portion of the one end portion of the biasing member in the extension direction. The second engagement portion is engaged with a second engaged portion of the one end portion in the extension direction in the same position as a position of engagement between the first engagement portion and the first engaged portion in the seat width direction or in a position on the inner side from the position of engagement in the seat width direction, the second engaged portion being positioned closer to the one end of the biasing member in the extension direction than the first engaged portion. According to such a positional relation, the biasing member is prevented from dropping out of the hollow member, and therefore, the biasing member can be favorably fitted in place.

Also, in the above-described vehicle seat, the second engaged portion may be a portion located most adjacent to one end side of the one end portion of the biasing member in the extension direction, and the second engaged portion linearly extends from the biasing member. With the above-described configuration, the second engaged portion located most adjacent to the one end side of the biasing member in the extension direction linearly extends at the one end portion of the biasing member in the extension direction. Thus, e.g., the process of forming the second engaged portion in a bent shape is not necessary, and therefore, the biasing member can be more easily obtained.

Further, in the above-described vehicle seat, the first engagement portion may be formed in such a manner that an outer peripheral portion of the hollow member is recessed, and the first engagement portion extends in the seat width direction. The seat cushion frame may include a buttock support member provided between the side frames in the seat width direction and configured to support the buttocks of a passenger. An attachment portion to which the buttock support member is attached may be provided at a portion of the outer peripheral portion, which is separated from the first engagement portion in the seat width direction. With the above-described configuration, the buttock support member is fastened to the portion of the outer peripheral portion of the hollow member separated from the first engagement portion in the seat width direction, and therefore, the buttock support member can be properly fastened to the hollow member.

Furthermore, in the above-described vehicle seat, the hollow member may include both end portions in the seat width direction, and one of the both end portions, which is positioned on the same side on which the one end portion of the biasing member in the extension direction is positioned, may be fitted in a tubular member forming a separate member from the hollow member. In addition, the one of the both end portions may be attached to one of the side frames through the tubular member. The first engagement portion, the second engagement portion, the first engaged portion, and the second engaged portion may be positioned between the attachment portion and the tubular member in the seat width direction. With the above-described configuration, a space between the attachment portion and the tubular member in the seat width direction is utilized and thereby the first engagement portion, the second engagement portion, the first engaged portion, and the second engaged portion can be favorably fitted in place.

Moreover, in the above-described vehicle seat, a bent portion may be formed at the biasing member to be located at a boundary portion between the one end portion of the biasing member in the extension direction and a center portion of the biasing member in the extension direction. The bent portion may be positioned within an area including the first engagement portion in the seat width direction or within an area including the second engagement portion in the seat width direction. With the above-described configuration, the area including the first engagement portion or the area including the second engagement portion in an inner space of the hollow member is utilized and thereby the bent portion can be favorably fitted in place.

Also, in the above-described vehicle seat, a turned-back portion, turned back in a U-shape, may be formed at the one end portion of the biasing member in the extension direction and configured to be positioned between the first engaged portion and the second engaged portion. The turned-back portion may be positioned within an area including the first engagement portion in the seat width direction or within an area including the second engagement portion in the seat width direction. With the above-described configuration, the area including the first engagement portion or the area including the second engagement portion in the inner space of the hollow member is utilized and thereby the turned-back portion can be favorably fitted in place.

Further, in the above-described vehicle seat, the biasing member may include a rod-shaped spring, and the biasing member may be housed in a twisted state in the hollow member to upwardly bias the seat cushion frame via the hollow member. With the above-described configuration, in the case of using a rod-shaped spring as the biasing member, the biasing member can be prevented from dropping out of the hollow member, and therefore, the biasing member can be favorably held in the arrangement position thereof.

Furthermore, in the above-described vehicle seat, any of the first engagement portion and the second engagement portion may be formed in such a manner that an outer peripheral portion of the hollow member is recessed. A portion of the outer peripheral portion, which is recessed to form the first engagement portion and a portion of the outer peripheral portion, which is recessed to form the second engagement portion, may be at positions different from each other in a circumferential direction of the outer peripheral portion and in the same position in the seat width direction. With the above-described configuration, the portion of the outer peripheral portion, which is recessed to form the first engagement portion and the portion of the outer peripheral portion, which is recessed to form the second engagement portion are at the positions different from each other in the circumferential direction of the outer peripheral portion and in the same position in the seat width direction. Thus, each of the first and second engagement portions can be easily provided at the hollow member, and both engagement portions can be suitably positioned for holding the biasing member in the hollow member.

According to an embodiment of the present disclosure, the biasing member can be prevented from dropping out of the hollow member, and therefore, the biasing member can be favorably held in the arrangement position thereof. Moreover, according to an embodiment of the present disclosure, the second engaged portion located most adjacent to the one end side of the biasing member in the extension direction linearly extends at the one end portion of the biasing member in the extension direction. Thus, e.g., the process of forming the second engaged portion in the bent shape is not necessary, and therefore, the biasing member can be more easily obtained. Further, according to an embodiment of the present disclosure, the buttock support member is fastened to the portion of the outer peripheral portion of the hollow member separated from the first engagement portion in the seat width direction, and therefore, the buttock support member can be properly fastened to the hollow member. In addition, according to an embodiment of the present disclosure, the space between the attachment portion and the tubular member in the seat width direction is utilized and thereby the first engagement portion, the second engagement portion, the first engaged portion, and the second engaged portion can be arranged in the favorable housing state. Moreover, according to an embodiment of the present disclosure, the area including the first engagement portion or the area including the second engagement portion in the inner space of the hollow member is utilized and thereby the bent portion formed at the boundary portion between the one end portion and the center portion of the biasing member in the extension direction can be favorably fitted in place. Further, according to an embodiment of the present disclosure, the area including the first engagement portion or the area including the second engagement portion in the inner space of the hollow member is utilized and thereby the turned-back portion, which is turned back in the U-shape, of the one end portion of the biasing member in the extension direction can be favorably fitted in place. In addition, according to an embodiment of the present disclosure, in the case of using the rod-shaped spring as the biasing member, the biasing member can be prevented from dropping out of the hollow member, and therefore, the biasing member can be favorably held in the arrangement position thereof. Moreover, according to an embodiment of the present disclosure, each of the first and second engagement portions can be easily provided at the hollow member, and both engagement portions can be suitably positioned for holding the biasing member in the hollow member.

BRIEF DESCRIPTION OF DRAWINGS

Various embodiments of the invention are illustrated in the drawings, in which.

DETAILED DESCRIPTION

Configuration of Vehicle Seat of One Embodiment of the Present Disclosure

The configuration of a vehicle seat of an embodiment of the present disclosure (the present embodiment) is described below. Note that the embodiment described below is set forth for the sake of easy understanding of the present disclosure and that the embodiment is not intended to limit the present disclosure. It is understood that changes and modifications can be made to the present disclosure without departing from the scope of the present disclosure and that the present disclosure includes equivalents thereof.

Note that in the descriptions below, "a front-to-back direction" means a front-to-back direction when viewed from a person seated on the vehicle seat, and coincides with a traveling direction of a vehicle. "A seat width direction" means a horizontal width direction of the vehicle seat and coincides with a right-to-left direction when viewed from the person seated on the vehicle seat. "A height direction" means a height direction of the vehicle seat and coincides with an up-to-down direction when the vehicle seat is viewed from the front.

Figure 1:
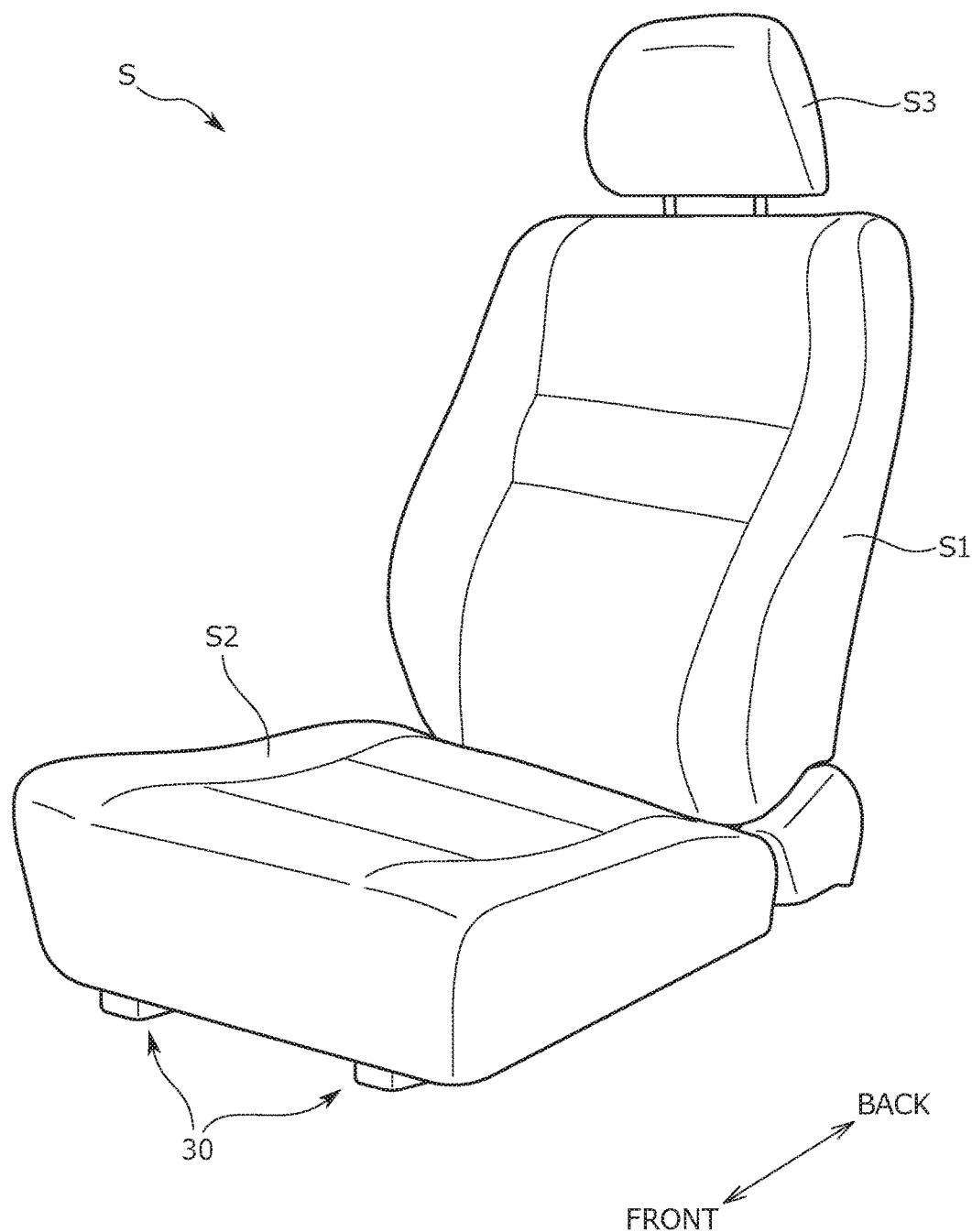
FIG. 1 is a perspective view of an outer appearance of a vehicle seat according to an embodiment according to the present disclosure.

First, a basic configuration of a vehicle seat S according to the present embodiment is described. The vehicle seat S of the present embodiment has a similar configuration to a general vehicle seat, and as illustrated in FIG. 1, the vehicle seat S has a seat back S1, a seat cushion S2, and a head rest S3. Moreover, slide rail mechanisms 30 configured to slidably move a seat body (a main portion of the vehicle seat S) in the front-to-back direction are disposed at a lower portion of the seat cushion S2. Further, the vehicle seat S includes, as a framework thereof, a seat frame F illustrated in FIG. 2. The seat frame F includes, as main components, a seat back frame 10 and a seat cushion frame 20.

The seat back frame 10 includes an inverted U-shaped upper frame 11, side frames 12 forming both end portions of the seat back frame 10 in the seat width direction, and a lower member frame 13 bridged between lower end portions of the side frames 12. Moreover, a reclining shaft 14 of a reclining mechanism is set between the lower end portions of a right and left pair of side frames 12 in a state where the reclining shaft 14 extends through the side frames 12.

Figure 2:
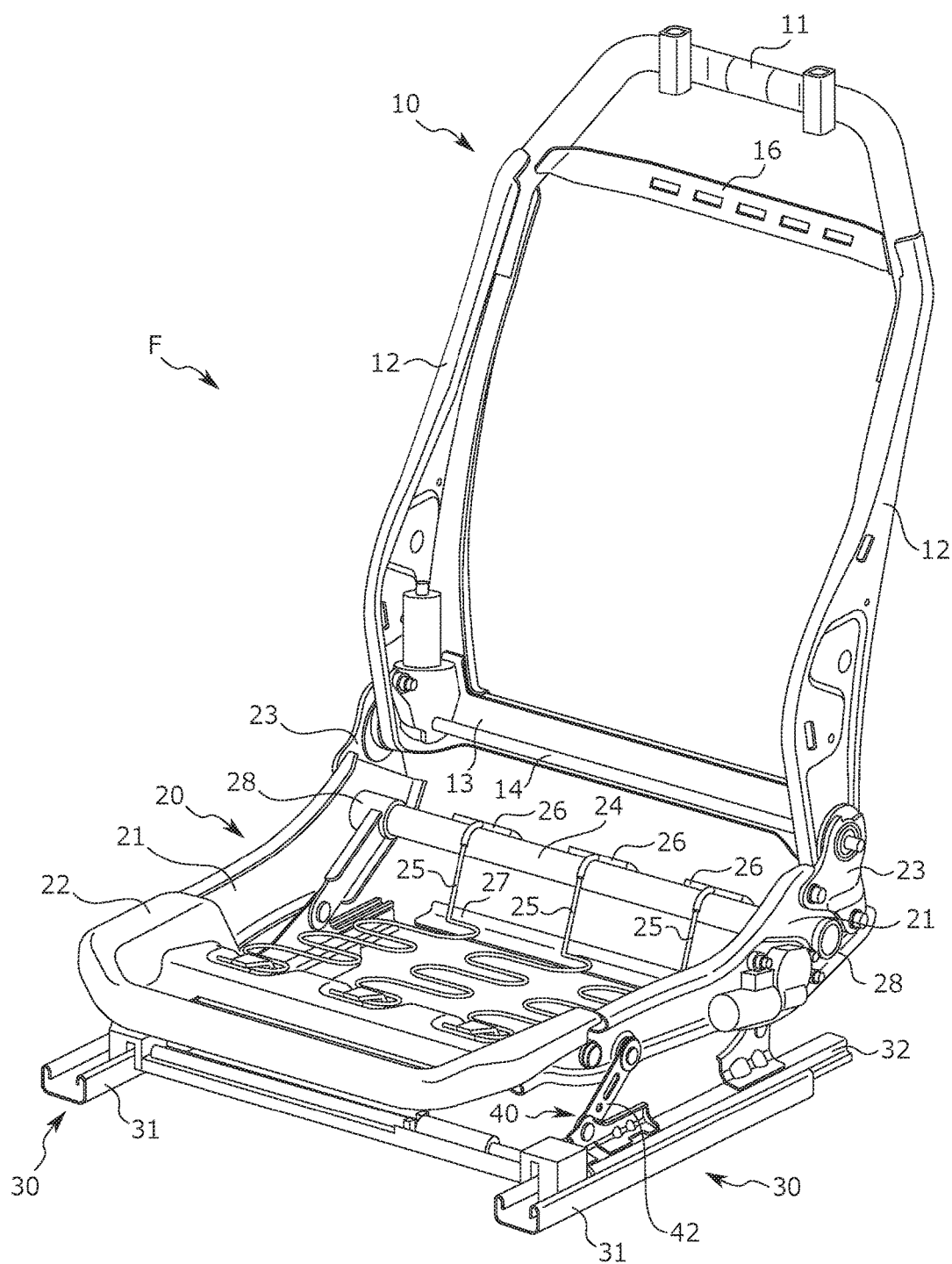
FIG. 2 is a perspective view of a frame structure of the vehicle seat according to the embodiment according to the present disclosure.

The seat cushion frame 20 has an outer shape in a rectangular frame shape when viewed from above. The seat cushion frame 20 includes, as main components, side frames 21 positioned respectively at both end portions of the seat cushion frame 20 in the seat width direction, and a pan frame 22 forming a front end portion of the seat cushion frame 20. Moreover, an upper portion of a back end portion of each of the side frames 21 is attached via an attachment bracket 23 to a back end portion of the seat cushion frame 20. Further, as illustrated in FIG. 2, lower portions of the back end portions of the side frames 21 are coupled together by a member extending in the seat width direction. This member is a coupling pipe 24 formed as a hollow member, and specifically, the member includes a round pipe. Moreover, both end portions of the coupling pipe 24 in the seat width direction are supported by the side frames 21 through end sleeves 28 formed as tubular members.

More specifically, each of the end sleeves 28 is a round pipe-shaped member forming a separate member from the coupling pipe 24, and the end sleeve 28 has an inner diameter slightly larger than an outer diameter of the coupling pipe 24. Both end portions of the coupling pipe 24 in the seat width direction are fitted respectively in the end sleeves 28 to be eventually fixed by welding.

Figure 3:
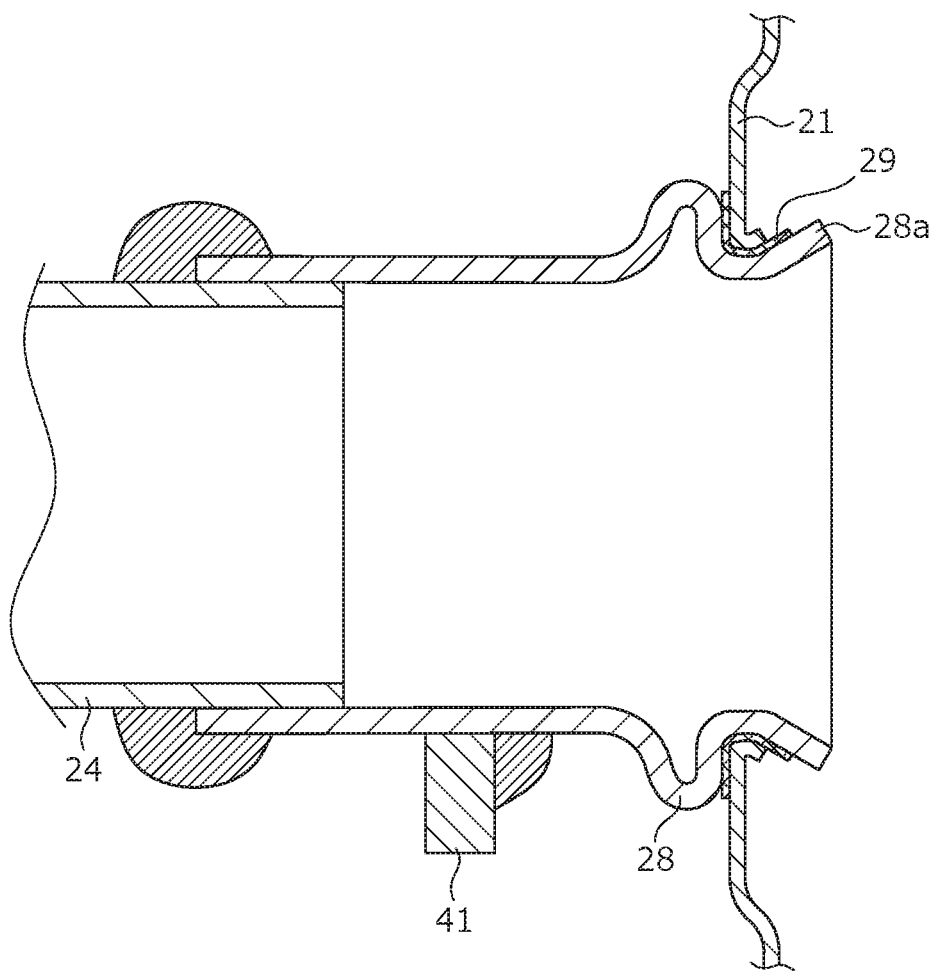
FIG. 3 is a cross-sectional view of the structure for attaching an end portion of a hollow member to a side frame through a tubular member.

Also, as illustrated in FIG. 3, the end sleeve 28 is inserted into a through-hole formed in the back end portion of the side frame 21 and has a flare-shaped lock portion 28a formed in such a manner that an outer end portion of the end sleeve 28 in the seat width direction is swaged. Thus, the coupling pipe 24 is supported by the side frame 21 through the end sleeve 28. In addition, the end sleeve 28, to which a sector gear 41a is welded, is configured such that a large-diameter portion (a portion raised in a mound shape in FIG. 3) of the end sleeves 28 is brought into contact with an inner wall of the side frame 21 to thereby restrict outward movement of the coupling pipe 24 in the seat width direction. Moreover, the outer end portion of the end sleeve 28 in the seat width direction in the above-described state is swaged and thereby the above-described flare-shaped lock portion 28a is formed. The lock portion 28a restricts inward movement of the coupling pipe 24 in the seat width direction.

Also, as illustrated in FIG. 3, an annular bushing 29 is interposed between the end sleeve 28 and the through-hole formed in the side frame 21 for insertion of the end sleeve 28. Thus, the coupling pipe 24 and the end sleeve 28 are supported by the side frame 21 to rotate relative to the side frame 21. In other words, the side frame 21 is rotatable relative to the coupling pipe 24 and the end sleeve 28 about the center of rotation, i.e., the center axes of the coupling pipe 24 and the end sleeve 28.

Figure 4:
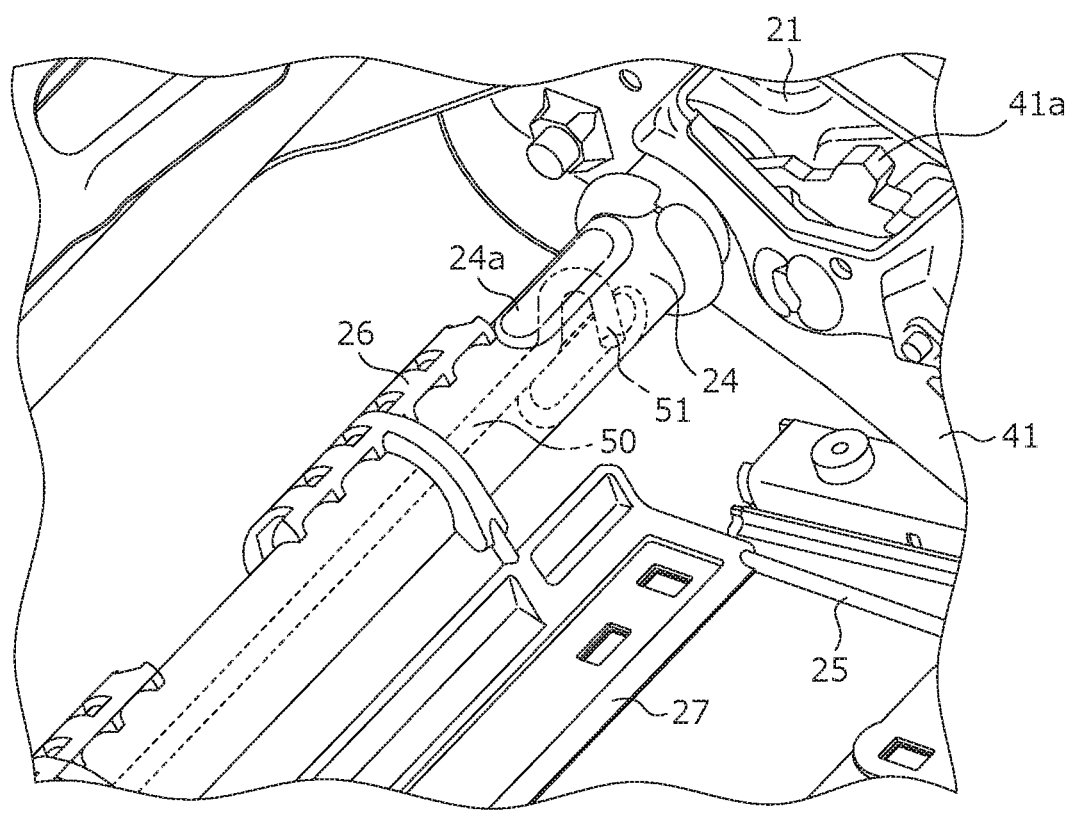
FIG. 4 is an enlarged perspective view of surroundings of the end portion of the hollow member.

The structure of the seat cushion frame 20 is now further described. A plurality of S-springs 25, provided as buttock support members, are located between the right and left pair of side frames 21 to be arranged side by side in the seat width direction. Each of the S-springs 25 is provided to support the buttocks of a passenger (e.g., a person seated on the seat), and the S-spring 25 extends in an elongated manner in the front-to-back direction. Moreover, front end portions of the S-springs 25 are fixed to an upper end surface of the pan frame 22. Back end portions of the S-springs 25 are fastened to the above-described coupling pipe 24 by engagement hooks 26 and an L-angled fixing bracket 27 that are arranged between the side frames 21. More specifically, as illustrated in FIG. 4, the back end portion of the S-spring 25 is fixed to an upper end surface of the fixing bracket 27. Moreover, as illustrated in this figure, the engagement hook 26 extends from a back end of the fixing bracket 27 to be hooked on an outer peripheral surface of the coupling pipe 24. Thus, the back end portion of each S-spring 25 is attached to the coupling pipe 24. In other words, a portion of the outer peripheral portion of the coupling pipe 24 on which the engagement hook 26 is hooked serves as an attachment portion to which the S-spring 25 is attached. In addition, in the present embodiment, an engagement method by the engagement hooks 26 is employed as a method of attaching the S-springs 25 to the coupling pipe 24, but other suitable attachment methods can be selected. For example, a fastening method by a fastener such as a bolt may be employed.

Also, the vehicle seat S of the present embodiment includes a height adjustment mechanism 40 configured to adjust the height of the seat cushion S2. The height adjustment mechanism 40 is disposed between the seat cushion frame 20 and an upper rail 32 of the slide rail mechanism 30 in the up-to-down direction. When a passenger executes height adjustment operation (e.g., the operation of pressing a not-shown up-and-down button), movable portions (technically, a link 41, a link 43, and the like described below) of the height adjustment mechanism 40 are operated. Therefore, the height of the seat body including the seat cushion S2 is adjusted.

Figure 5:
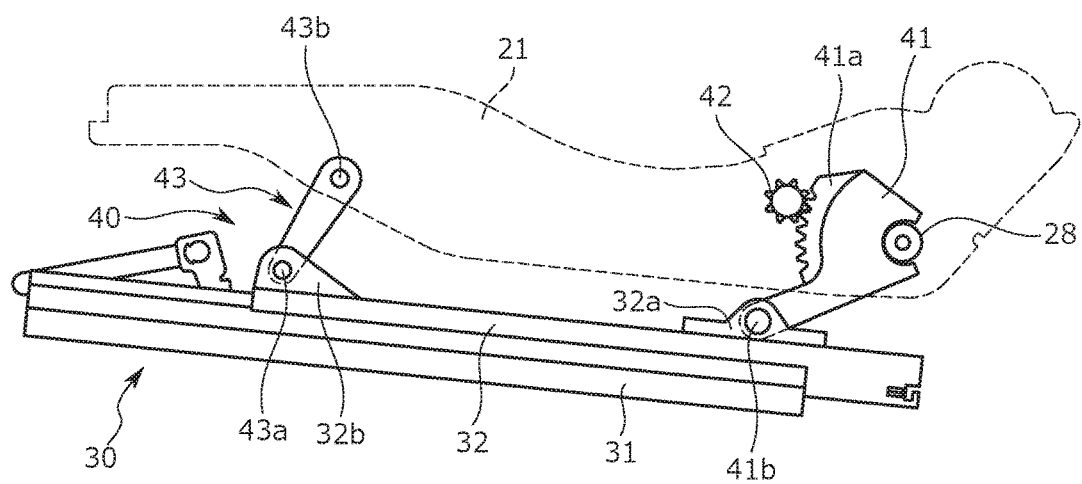
FIG. 5 is a side, schematic view of a height adjustment mechanism.
Figure 6A:
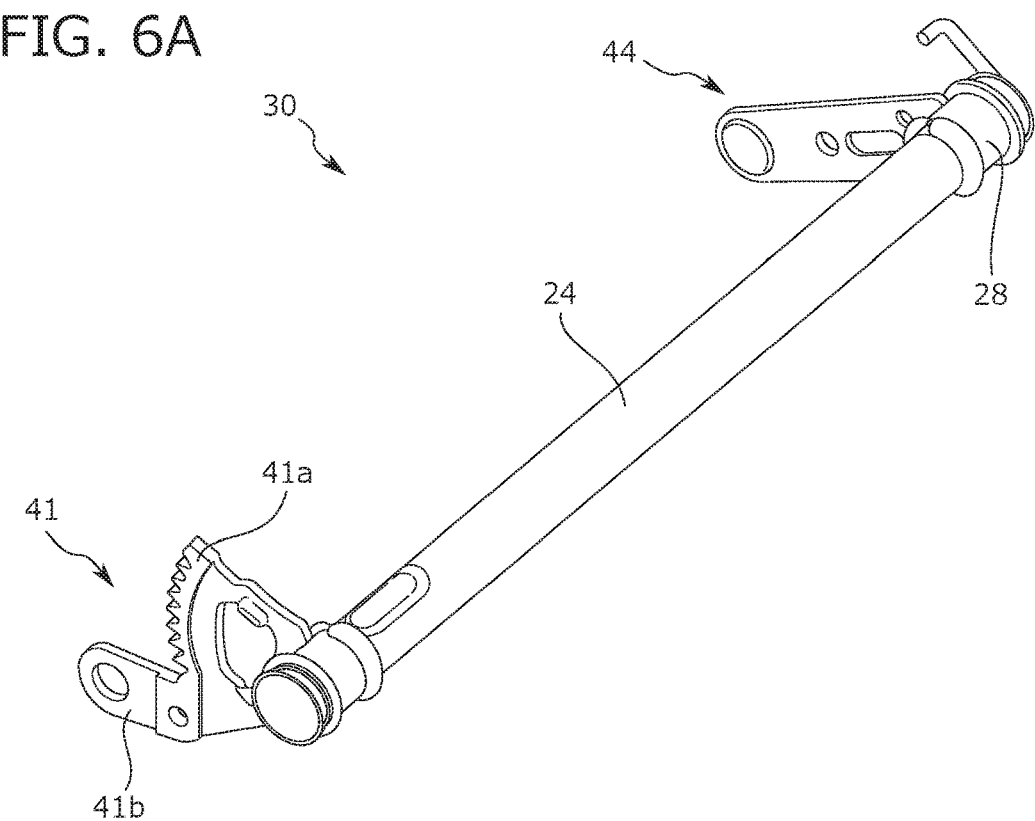
FIG. 6A is a perspective view of a back link provided at the height adjustment mechanism.

The configuration of the height adjustment mechanism 40 according to the present embodiment is described below with reference to FIGS. 5 and 6. As illustrated in FIG. 5 and FIG. 6A, the height adjustment mechanism 40 has the main driving link 41, a pinion gear 42, and the driven links 43, 44. The main driving link 41 and the driven links 43, 44 pivot together with the seat cushion S2 in the front-to-back direction and the up-to-down direction.

Also, the main driving link 41 includes a metal plate member. Among the right and left pair of side frames 21 provided at the seat cushion frame 20, the main driving link 41 is positioned side by side with the side frame 21 located on the outer side in the seat width direction. Moreover, one end portion of the main driving link 41 in a longitudinal direction thereof is pivotally supported via a pivot pin 41b by a link support portion 32a placed on an upper surface of the upper rail 32. Further, the other end portion of the main driving link 41 in the longitudinal direction has a substantially fan-shaped outer shape as illustrated in FIGS. 5 and 6. In addition, gear teeth are formed at a front end portion of the substantially fan-shaped other end portion of the main driving link 41 in the longitudinal direction is. That is, the other end portion of the main driving link 41 in the longitudinal direction forms the sector gear 41a and engages with the pinion gear 42 as illustrated in FIG. 5. Among the right and left pair of side frames 21 provided at the seat cushion frame 20, the pinion gear 42 is rotatably attached to the side frame 21 located on the outer side in the seat width direction. Moreover, the pinion gear 42 is coupled to a drive motor attached to the side frame 21.

Further, in the main driving link 41 according to the present embodiment, a portion (i.e., the front end portion of the other end portion in the longitudinal direction) of the main driving link 41, which forms the sector gear 41a, has a thickness larger than those of other portions as illustrated in FIGS. 5 and 6. More specifically, the large thickness portion of the main driving link 41, which forms the sector gear 41a (more precisely, the gear portion of the sector gear 41a and the portion of the sector gear 41a positioned right below the lowermost gear portion) is formed to protrude toward the adjoining side frame 21.

The driven links 43, 44 including metal plate members are links configured to pivot along with the pivotal movement of the main driving link 41. Among the driven links 43, 44, the driven link 43 disposed on the front side of the seat is supported by the side frame 21 of the seat cushion frame 20 and the upper rail 32 to pivot relative thereto. Specifically, one end portion of the driven link 43 in a longitudinal direction thereof is, as illustrated in FIG. 5, pivotally supported via a pivot pin 43a by a link support portion 32b placed on the upper surface of the upper rail 32. As illustrated in FIG. 5, the other end portion of the driven link 43 in the longitudinal direction is pivotally supported via a pivot pin 43b by a lower end portion of the side frame 21.

Among the driven links 43, 44, the driven link 44 disposed on the back side of the seat is configured substantially in the same way as the driven link 43 and thus is supported by the side frame 21 of the seat cushion frame 20 and the upper rail 32 to pivot relative thereto.

Figure 6B:
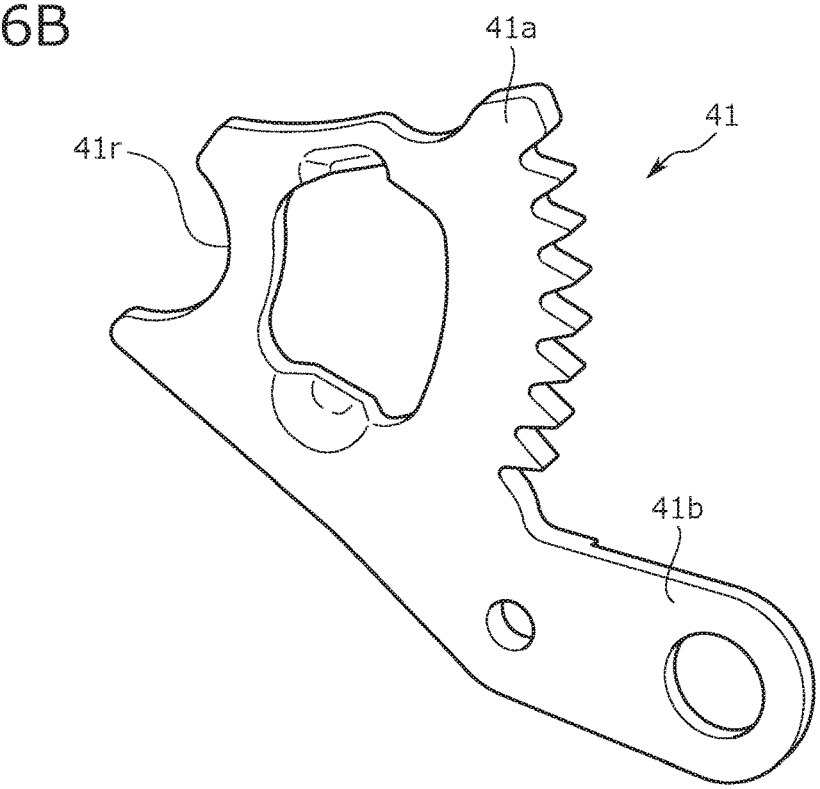
FIG. 6B is a perspective view of a main driving link.

Also, the driven link 44 is paired with the main driving link 41 as illustrated in FIG. 6. Specifically, the main driving link 41 and the driven link 44 are coupled together by the coupling pipe 24 and the end sleeves 28. More specifically, as illustrated in FIG. 6B, one of the both end portions of the main driving link 41 in the longitudinal direction, which has the sector gear 41a, has, at a back portion thereof, a semicircular cut portion 41r. The end sleeve 28, into which one end portion of the coupling pipe 24 in the seat width direction, is fitted to the cut portion 41r, and the end sleeve 28 and the cut portion 41r are fixed by welding. On the other hand, one of the both end portions of the driven link 44, which is supported by the side frame 21 has, at a back portion thereof, a semicircular cut portion 44r. The end sleeve 28, into which the other end portion of the coupling pipe 24 in the seat width direction, is fitted to the cut portion 44r, and the end sleeve 28 and the cut portion 44r are fixed by welding.

Operation of the height adjustment mechanism 40 configured as described above is now described. A passenger, as a person seated on the seat, executes the height adjustment operation (e.g., the operation of pressing a not-shown up-and-down button), and accordingly, the drive motor coupled to the pinion gear 42 is driven to rotate the pinion gear 42. When the pinion gear 42 rotates, the position of engagement between the pinion gear 42 and the sector gear 41a changes. Accordingly, the main driving link 41 and the driven links 43, 44 are brought into pivotal movement. At this time, the end sleeves 28 welded respectively to the main driving link 41 and the driven link 44, and the coupling pipe 24 fitted into the end sleeves 28 integrally pivot. Thus, the side frames 21 of the seat cushion frame 20 rotate relative to the coupling pipe 24 and the end sleeves 28 about the center of rotation, i.e., the center axes of the coupling pipe 24 and the end sleeves 28. As a result, the seat cushion frame 20 moves up and down; therefore, the height of the seat body is adjusted.

As described above, the height adjustment mechanism 40 according to the present embodiment is configured to move the seat body up and down by use of rotating force of the drive motor but is not limited thereto. Alternatively, the height adjustment mechanism may be manually operated without use of the drive motor. For example, the height adjustment mechanism may be configured to, when a lever or the like is operated by a person seated on the seat, operate by movement of the operation lever.

In addition, a member configured to assist the above-described operation of the height adjustment mechanism 40, i.e., height adjustment of the seat cushion S2 by the height adjustment mechanism 40, is used in the vehicle seat S according to the present embodiment. Such a member is described below with reference to FIGS. 7 to 9.

The member configured to assist height adjustment of the seat cushion S2 by the height adjustment mechanism 40 is a biasing member configured to upwardly bias the seat cushion. This biasing member upwardly biases the seat cushion S2 when the seat cushion S2 is moved up, thereby assisting the height adjustment mechanism 40. Moreover, the above-described biasing member upwardly biases the seat cushion S2 when the seat cushion S2 is moved down, thereby functioning as a resistor against downward movement of the seat cushion S2. As a result, the seat cushion S2 is prevented from rapidly moving downward.

Figure 7:
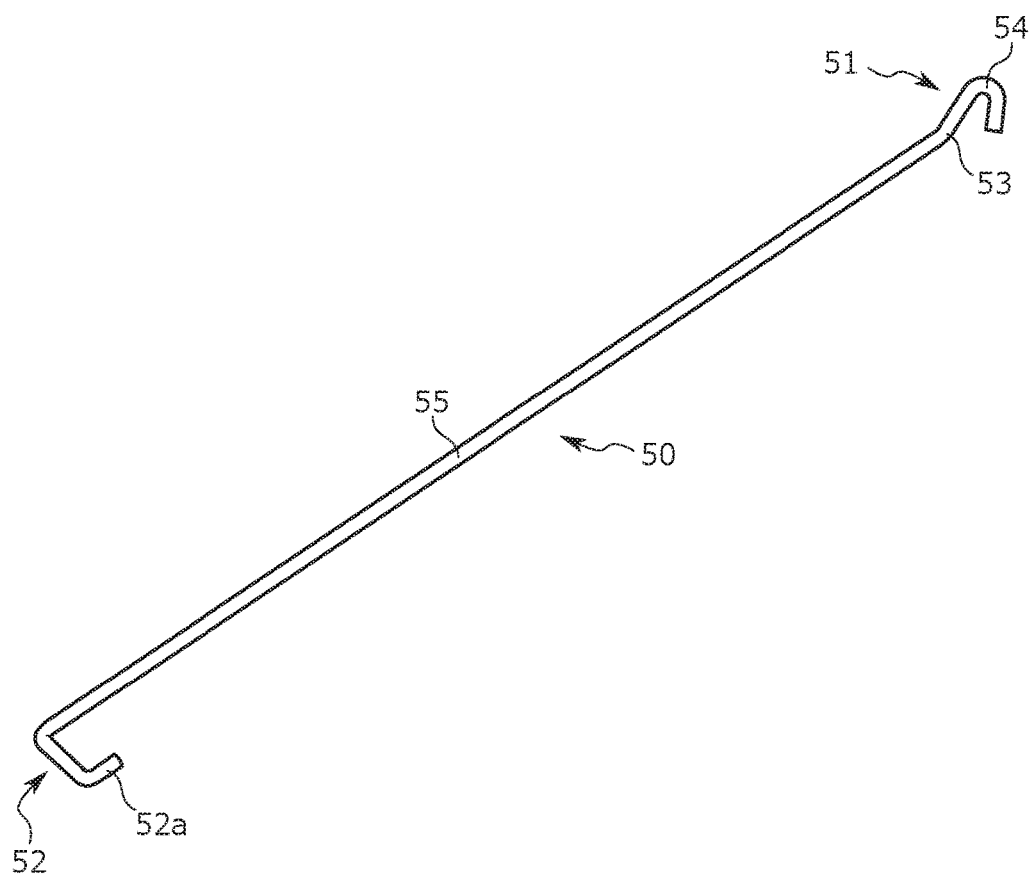
FIG. 7 is a perspective view of an outer appearance of a biasing member.

In the vehicle seat S according to the present embodiment, a torsion bar 50 illustrated in FIG. 7 is used as the biasing member. The torsion bar 50 includes a rod-shaped spring, and more specifically, the torsion bar 50 includes a metal rod spring having a relatively large diameter. The shape of the torsion bar 50 is described with reference to FIG. 7. The torsion bar 50 has one end portion 51 in an extension direction thereof, the other end portion 52 in the extension direction, and a center portion 55 in the extension direction. "The extension direction of the torsion bar 50" described herein is a direction from a tip end to a distal end of the torsion bar 50 bent as in FIG. 7, that is, a direction along the shape of the torsion bar 50.

The one end portion 51 of the torsion bar 50 in the extension direction is a portion curved in a hook shape, and the center portion 55 in the extension direction is a linearly extending portion. Also, a bent portion 53 bent at an obtuse angle is formed at a boundary portion between the one end portion 51 and the center portion 55 in the extension direction. Further, a turned-back portion 54 turned back in a U-shape is formed in the middle of the one end portion 51 in the extension direction. The other end portion 52 of the torsion bar 50 in the extension direction is substantially perpendicular to the center portion 55 in the extension direction, and a bent tip end portion 52a bent in an L-shape is formed at a tip end portion of the other end portion 52 in the extension direction.

The torsion bar 50 having the above-described shape is attached to the seat cushion S2 in a state where the center portion 55 in the extension direction is twisted (more specifically, in a state where the center portion 55 in the extension direction is twisted in the direction of rotation about the center axis of the center portion 55 in the extension direction). In addition, the torsion bar 50 uses, as a biasing force, a restoring force upon restoring from the twisted state, thereby upwardly biasing a predetermined portion of the seat cushion S2.

Figure 8:
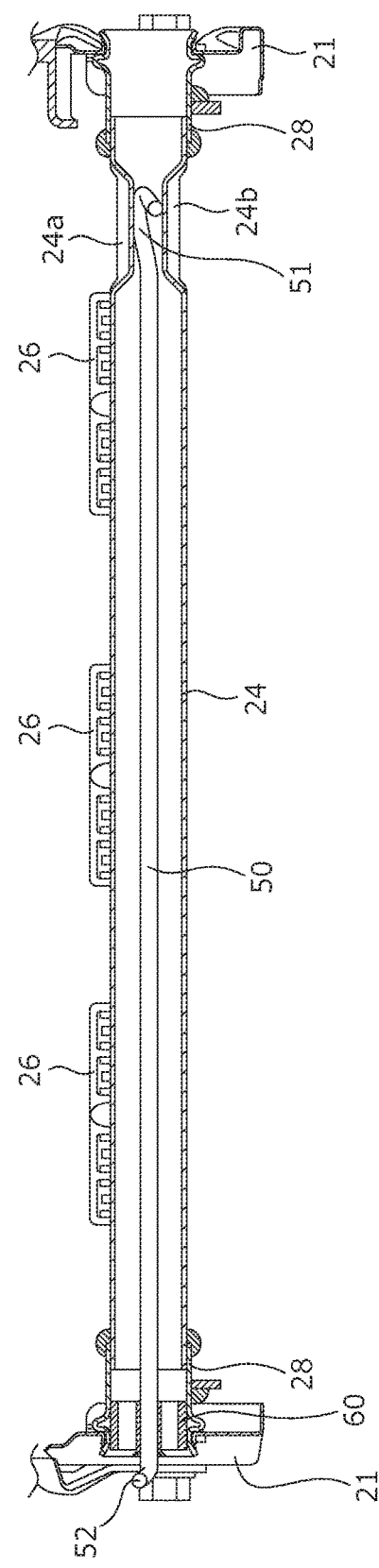
FIG. 8 is an explanatory diagram for illustrating arrangement of the biasing member.

In addition, in the present embodiment, the torsion bar 50 is used while being housed in the coupling pipe 24 as illustrated in FIG. 8. That is, the torsion bar 50 according to the present embodiment is housed in the coupling pipe 24 in the twisted state; thereby, the seat cushion S2 is upwardly biased via the coupling pipe 24 and the end sleeves 28.

Figure 9:
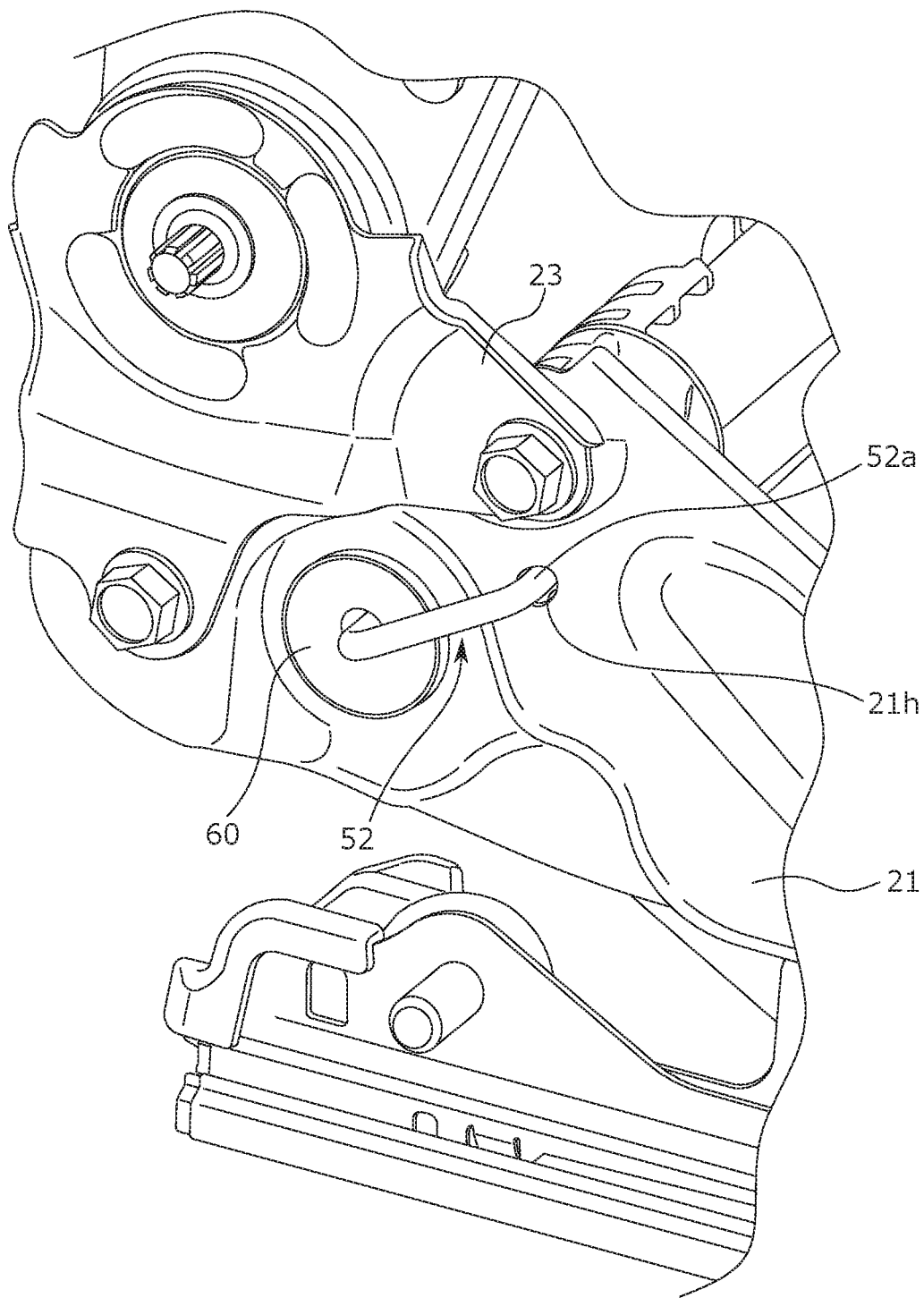
FIG. 9 is a perspective view of a state where an end portion of the biasing member in an extension direction thereof is locked to the side frame.

More specifically, the structure for holding the torsion bar 50 in the twisted state in the coupling pipe 24 is provided at the coupling pipe 24, the end sleeves 28, and the side frames 21. Specifically, an inner end of the sleeve 28 (i.e., the end sleeve 28 to which the driven link 44 is welded) in the width direction thereof is fitted to one of the both end portions of the coupling pipe 24 and a resin cap 60 illustrated in FIGS. 8 and 9 is fitted into an opening end of such an end sleeve 28. The resin cap 60 has a through-hole, and a portion of the center portion 55 of the torsion bar 50, which is adjacent to the other end portion 52 in the extension direction is inserted into the through-hole. Moreover, as illustrated in FIG. 8, the other end portion 52 in the extension direction extends through the above-described through-hole to the outside of the opening end of the end sleeve 28 and further extends beyond the side frame 21 to which the end sleeve 28 is attached, thereafter extending to the outer side of the seat frame 21 in the seat width direction. Accordingly, as illustrated in FIG. 9, the bent tip end portion 52a is hooked on an engagement hole 21h formed at the side frame 21, and thereby the other end portion 52 in the extension direction is engaged with the side frame 21.

Engagement portions configured to be engaged with the one end portion 51 of the torsion bar 50 in the extension direction are formed on an inner peripheral surface of a portion of the coupling pipe 24, which is adjacent to the end sleeve 28 located at the outer side in the width direction (i.e., the end sleeve 28 to which the main driving link 41 is welded). These engagement portions are formed in such a manner that the outer peripheral portion of the coupling pipe 24 is recessed radially inward, and the two engagement portions are formed in the present embodiment. The engagement portions is described with reference to FIGS. 8 and 10. A first engagement portion 24a and a second engagement portion 24b are formed inside the portion of the coupling pipe 24, which is adjacent to the end sleeve 28 located at the outer side in the width direction. Any of these two engagement portions is formed in such a manner that the outer peripheral portion of the coupling pipe 24 is recessed.

Figure 10:
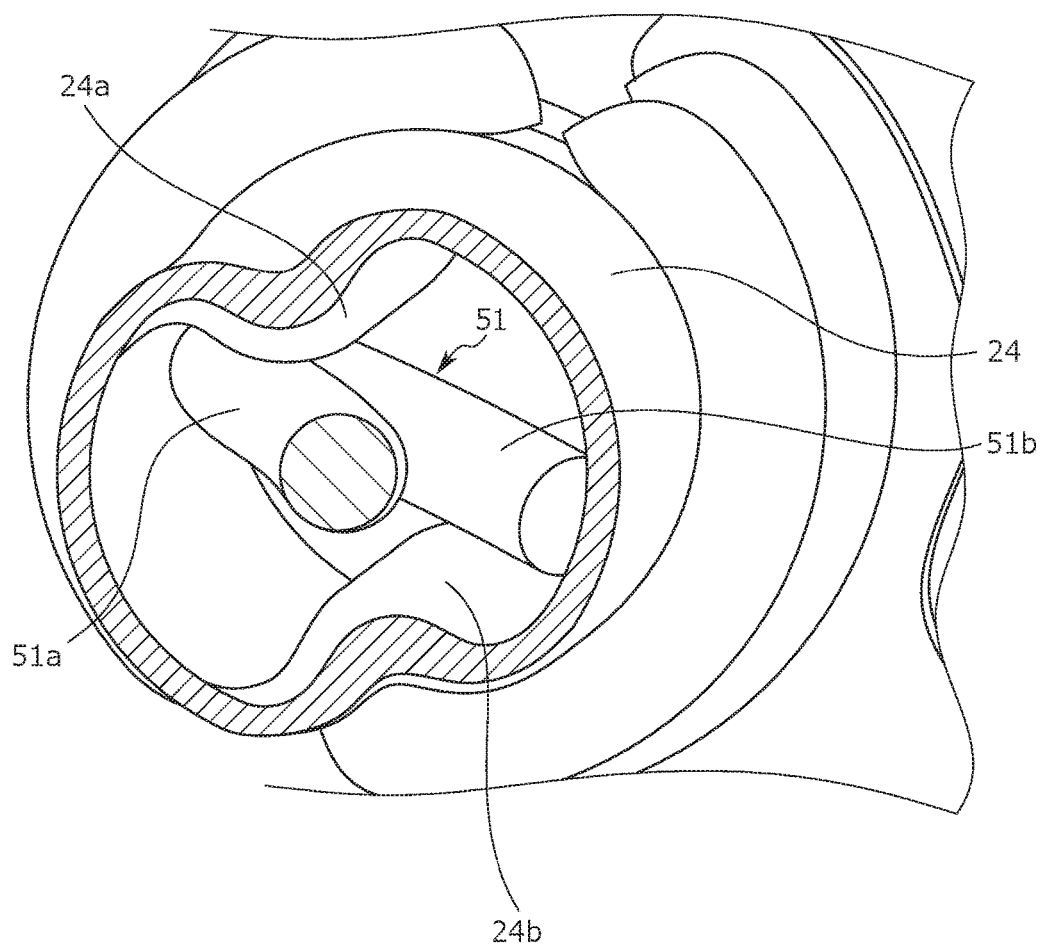
FIG. 10 is a cross-sectional view of the structure for holding the biasing member in the hollow member.

In addition, a portion of the outer peripheral portion of the coupling pipe 24, recessed to form the first engagement portion 24a, and a portion of the outer peripheral portion of the coupling pipe 24, recessed to form the second engagement portion 24b, are, as illustrated in FIG. 10, provided at different positions from each other in a circumferential direction of the outer peripheral portion, and in the present embodiment, these portions are at positions separated from each other approximately by 180°. On the other hand, the portion recessed to form the first engagement portion 24a and the portion recessed to form the second engagement portion 24b are in the same position in the seat width direction as illustrated in FIG. 8.

As illustrated in FIG. 10, the above-described two engagement portions are in contact and engaged, in the coupling pipe 24, with predetermined portions of the one end portion 51 of the torsion bar 50 in the extension direction. More specifically, the first engagement portion 24a is engaged with one (hereinafter referred to as "a first engaged portion 51a") of two portions of the one end portion 51 in the extension direction. The two portions of the one end portion 51 are located on opposite sides from each other with respect to the turned-back portion 54. The second engagement portion 24b is engaged with the other (hereinafter referred to as "a second engaged portion 51b") of the two portions of the one end portion 51 in the extension direction. In this state, the first engagement portion 24a and the second engagement portion 24b are in contact with the corresponding engaged portions to generate a contact force acting in the direction such that the torsion bar 50 in the twisted state is restricted from returning to the non-twisted state.

With the above-described configuration, the torsion bar 50 is held in the coupling pipe 24 while being twisted and in a state where the center portion 55 in the extension direction extends in the seat width direction. Further, in the present embodiment, a positional relation between the two engagement portions (the first engagement portion 24a and the second engagement portion 24b) provided at the coupling pipe 24 and the two engaged portions (the first engaged portion 51a and the second engaged portion 51b) provided at the one end portion 51 of the torsion bar 50 in the extension direction is suitably established. Thus, in the present embodiment, the state of holding the torsion bar 50 in the coupling pipe 24 can be favorably stabilized. The above-described positional relation is described below with reference to FIG. 11.

Figure 11:
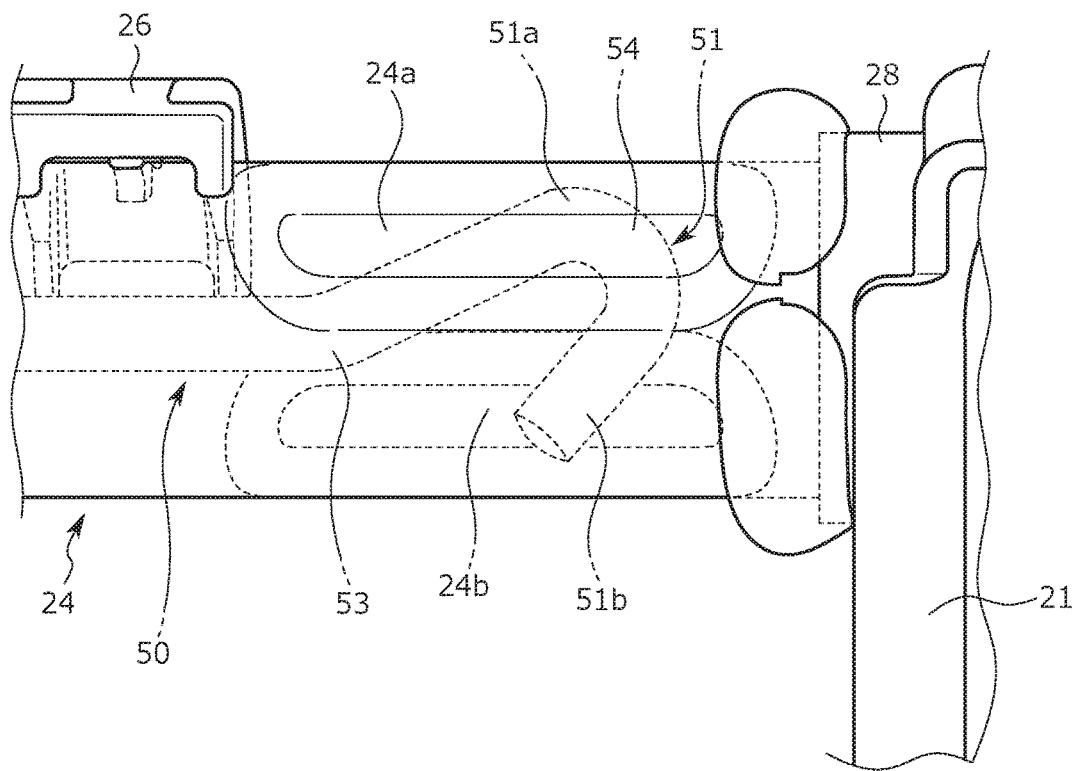
FIG. 11 is an explanatory view of a positional relation between engagement portions provided in the hollow member and engaged portions in the biasing member.

In the present embodiment, as illustrated in FIG. 11, the position of engagement between the first engagement portion 24a and the first engaged portion 51a is, in the seat width direction, the same as the position of engagement between the second engagement portion 24b and the second engaged portion 51b. A relationship between the first engaged portion 51a and the second engaged portion 51b is described herein. Both of these portions 51a and 51b are located at the one end portion 51 of the torsion bar 50 in the extension direction, and the second engaged portion 51b is positioned closer to one end of the torsion bar 50 in the extension direction than the first engaged portion 51a. In the present embodiment, the second engaged portion 51b is a portion located most adjacent to one end side of the one end portion 51 of the torsion bar 50 in the extension direction.

With the above-described position relationship, the torsion bar 50 can be prevented from dropping out of the coupling pipe 24, and therefore the coupling pipe 24 can be favorably held in the arrangement position thereof.

Also, in the present embodiment, the position of engagement between the first engagement portion 24a and the first engaged portion 51a is, in the seat width direction, the same as the position of engagement between the second engagement portion 24b and the second engaged portion 51b, but not limited thereto as long as the coupling pipe 24 is favorably held in the arrangement position thereof. Specifically, the position of engagement between the second engagement portion 24b and the second engaged portion 51b may be, in the seat width direction, at the inner side in the width direction with respect to the position of engagement between the first engagement portion 24a and the first engaged portion 51a.

In addition, in the present embodiment, the second engaged portion 51b is configured to linearly extend as illustrated in FIG. 11. With such a configuration, e.g., the process of forming the second engaged portion 51b in a bent shape is not necessary, and therefore the torsion bar 50 can be more easily obtained. Alternatively, the second engaged portion 51b may be curved in an arched shape.

Further, the bent portion 53 is formed at the boundary portion between the one end portion 51 and the center portion 55 of the torsion bar 50 in the extension direction. In addition, in the present embodiment, as illustrated in FIG. 11, in a state where the torsion bar 50 is housed in the coupling pipe 24, the bent portion 53 is positioned within an area including the first engagement portion 24a in the seat width direction or within an area including the second engagement portion 24b in the seat width direction. With this configuration, the area including the first engagement portion 24a or the area including the second engagement portion 24b in the inner space of the coupling pipe 24 is utilized and thereby the bent portion 53 can be favorably fitted in place.

The turned-back portion 54 turned back in the U-shape is formed at the middle portion of the one end portion 51 of the torsion bar 50 in the extension direction, more precisely, at a portion positioned between the first engaged portion 51a and the second engaged portion 51b. In addition, in the present embodiment, as illustrated in FIG. 11, in a state where the torsion bar 50 is housed in the coupling pipe 24, the turned-back portion 54 is positioned within the area including the first engagement portion 24a in the seat width direction or within the area including the second engagement portion 24b in the seat width direction. With this configuration, the area including the first engagement portion 24a or the area including the second engagement portion 24b in the inner space of the coupling pipe 24 is utilized and thereby the turned-back portion 54 can be favorably fitted in place.

Furthermore, in the present embodiment, the first engagement portion 24a and the second engagement portion 24b extend in the seat width direction to therein have a narrow width. Thus, the portions of the outer peripheral portion of the coupling pipe 24, which are recessed to form the engagement portions, also extend in the seat width direction. Moreover, as illustrated in FIGS. 3 and 11, the outer peripheral portion of the coupling pipe 24 has the attachment portion (specifically, the portion on which the engagement hook 26 is hooked) to which the back end portion of each S-spring 25 as the buttock support member is attached. Also, in the present embodiment, as illustrated in FIG. 11, the attachment portion is provided to be separated from the recessed portions (i.e., the portions provided with the first engagement portion 24a and the second engagement portion 24b) of the coupling pipe 24 in the seat width direction. With this configuration, each S-spring 25 can be appropriately fastened to the outer peripheral portion of the coupling pipe 24.

Among the both end portions of the coupling pipe 24 in the seat width direction, the end portion (i.e., the end portion on the outer side in the seat width direction) positioned on the same side on which the one end portion 51 of the torsion bar 50 in the extension direction is positioned in a state where the torsion bar 50 is housed in the pipe, is attached to the side frame 21 through the end sleeve 28 to which the main driving link 41 is welded. In addition, in the present embodiment, as illustrated in FIG. 11, the first engagement portion 24a and the second engagement portion 24b of the coupling pipe 24 and the first engaged portion 51a and the second engaged portion 51b of the torsion bar 50 are positioned between the fastened portion of the S-spring 25 and the above-described end sleeve 28 in the seat width direction. With this configuration, a space between the fastened portion and the end sleeve 28 in the seat width direction is utilized and thereby each engagement portion and each engaged portion can be favorably fitted in place.

TABLE OF REFERENCE NUMERALS

10: seat back frame
11: upper frame
12: side frame
13: lower member frame
14: reclining shaft
16: communication bracket
20: seat cushion frame
21: side frame
22: pan frame
23: attachment bracket
24: coupling pipe (hollow member)
    24a: first engagement portion
    24b: second engagement portion
25: S-spring (buttock support member)

-continued

TABLE OF REFERENCE NUMERALS

26: engagement hook
27: fixing bracket
28: end sleeve (tubular member)
    28a: lock portion
29: bushing
30: slide rail mechanism
32: upper rail
    32a, 32b: link support portion
40: height adjustment mechanism
41: main driving link
    41a: sector gear
    41b: pivot pin
    41r: cut portion
43, 44: driven link
    43a, 43b: pivot pin
    44r: cut portion
50: torsion bar (biasing member)
51: one end portion in extension direction
    51a: first engaged portion
    51b: second engaged portion
52: other end portion in extension direction
    52a: bent tip end portion
53: bent portion
54: turned-back portion
55: center portion in extension direction
60: resin cap
F: seat frame
R: height adjustment lever
S: vehicle seat
S1: seat back
S2: seat cushion
S3: head rest

The invention claimed is:

1. A vehicle seat comprising:
a seat cushion frame including side frames provided respectively at both end portions of the seat cushion frame in a seat width direction;
a height adjustment mechanism operable to adjust the height of the seat cushion frame;
a biasing member configured to assist adjustment of the height of the seat cushion frame by the height adjustment mechanism; and
a hollow member extending in the seat width direction and disposed between the side frames,
wherein the biasing member extends in the seat width direction while being housed in the hollow member,
first and second engagement portions configured to be engaged and to hold one end portion of the biasing member in an extension direction thereof are formed inside the hollow member,
the first engagement portion is engaged with a first engaged portion of the one end portion of the biasing member in the extension direction,
the second engagement portion is engaged with a second engaged portion of the one end portion of the biasing member in the extension direction so as to be provided, in the seat width direction, in the same position as a position of engagement between the first engagement portion and the first engaged portion or in a position on the inner side from the position of engagement, the second engaged portion being positioned closer to one end of the biasing member in the extension direction than the first engaged portion,
the hollow member includes both end portions in the seat width direction, and one of the both end portions, which is positioned on the same side on which the one end portion of the biasing member in the extension direction is positioned, is fitted in a tubular member forming a separate member from the hollow member, the one of the both end portions being attached to one of the side frames through the tubular member, and
the first engagement portion, the second engagement portion, the first engaged portion, and the second engaged portion are positioned on an inner side of an inner end of the tubular member in the seat width direction.

2. The vehicle seat of claim 1, wherein
the second engaged portion is a portion of the one end portion of the biasing member in the extension direction, which is located most adjacent to one end side of the biasing member in the extension direction, and the second engaged portion linearly extends from the biasing member.

3. The vehicle seat of claim 1, wherein
the first engagement portion is formed in such a manner that an outer peripheral portion of the hollow member is recessed, and the first engagement portion extends in the seat width direction,
the seat cushion frame includes a buttock support member provided between the side frames in the seat width direction and configured to support the buttocks of a passenger, and
an attachment portion to which the buttock support member is attached is provided at a portion of the outer peripheral portion, which is separated from the first engagement portion in the seat width direction.

4. The vehicle seat of claim 3, wherein
the first engagement portion, the second engagement portion, the first engaged portion, and the second engaged portion are positioned between the attachment portion and the tubular member in the seat width direction.

5. The vehicle seat of claim 1, wherein
a bent portion is formed at the biasing member to be located at a boundary portion between the one end portion of the biasing member in the extension direction and a center portion of the biasing member in the extension direction, and
the bent portion is positioned within an area including the first engagement portion in the seat width direction or within an area including the second engagement portion in the seat width direction.

6. The vehicle seat of claim 1, wherein
a turned-back portion, turned back in a U-shape, is formed at the one end portion of the biasing member in the extension direction and configured to be positioned between the first engaged portion and the second engaged portion, and
the turned-back portion is positioned within an area including the first engagement portion in the seat width direction or within an area including the second engagement portion in the seat width direction.

7. The vehicle seat of claim 1, wherein
the biasing member includes a rod-shaped spring, the biasing member being housed in a twisted state in the hollow member to upwardly bias the seat cushion frame via the hollow member.

8. The vehicle seat of claim 1, wherein
any of the first engagement portion and the second engagement portion is formed in such a manner that an outer peripheral portion of the hollow member is recessed, and
a portion of the outer peripheral portion, which is recessed to form the first engagement portion and a portion of the outer peripheral portion, which is recessed to form the second engagement portion, are at positions different from each other in a circumferential direction of the outer peripheral portion, and the portions of the outer peripheral portion, recessed to form the first engagement portion and the second engagement portion, are provided in the same position in the seat width direction.

9. The vehicle seat of claim 1, wherein
the tubular member is provided with a lock portion at an outer end portion of the tubular member in the seat width direction, and
the lock portion is raised outward in a radial direction of the tubular member along an outer periphery of the tubular member.

10. The vehicle seat of claim 1, wherein
the tubular member is disposed to overlap the one of the side frames in a seat front-to-rear direction.

11. The vehicle seat of claim 1, further comprising:
a link that is connected to the tubular member,
wherein a portion of the link that is connected to the tubular member has a semicircular shape.

* * * * *